Nov. 5, 1940.   E. A. PRESTON   2,220,275
SPRAY PRODUCER
Filed Feb. 17, 1939   3 Sheets—Sheet 1
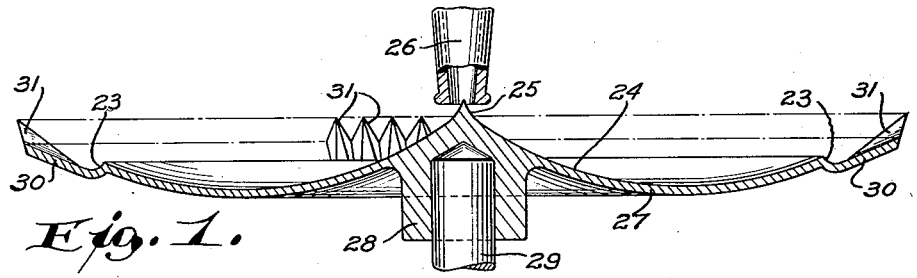
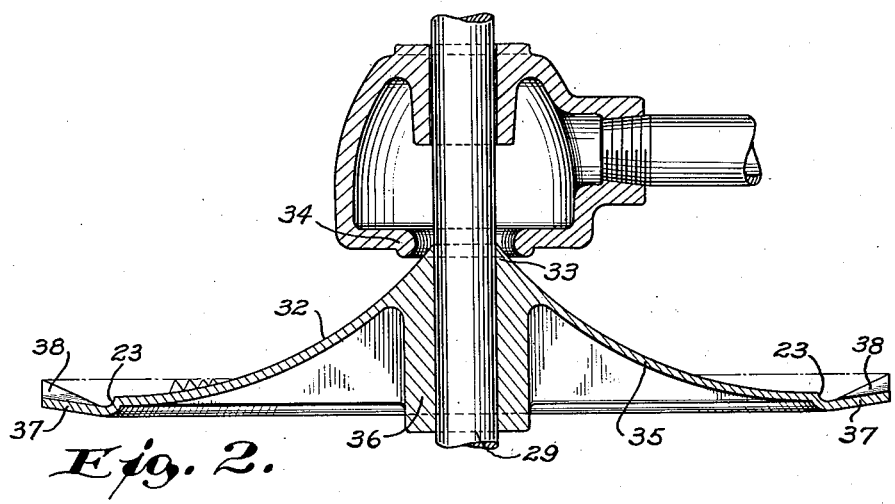
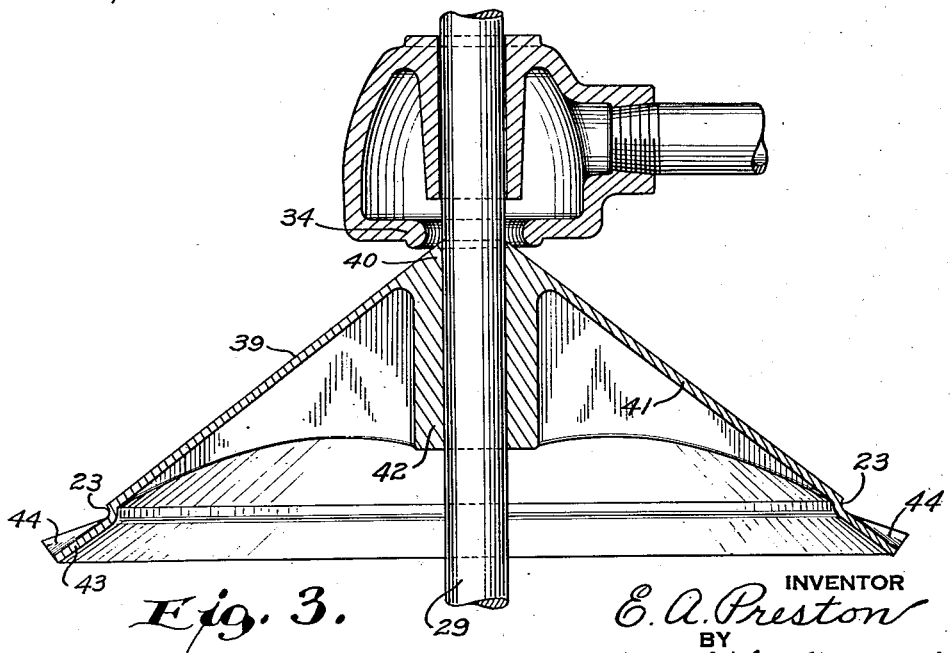

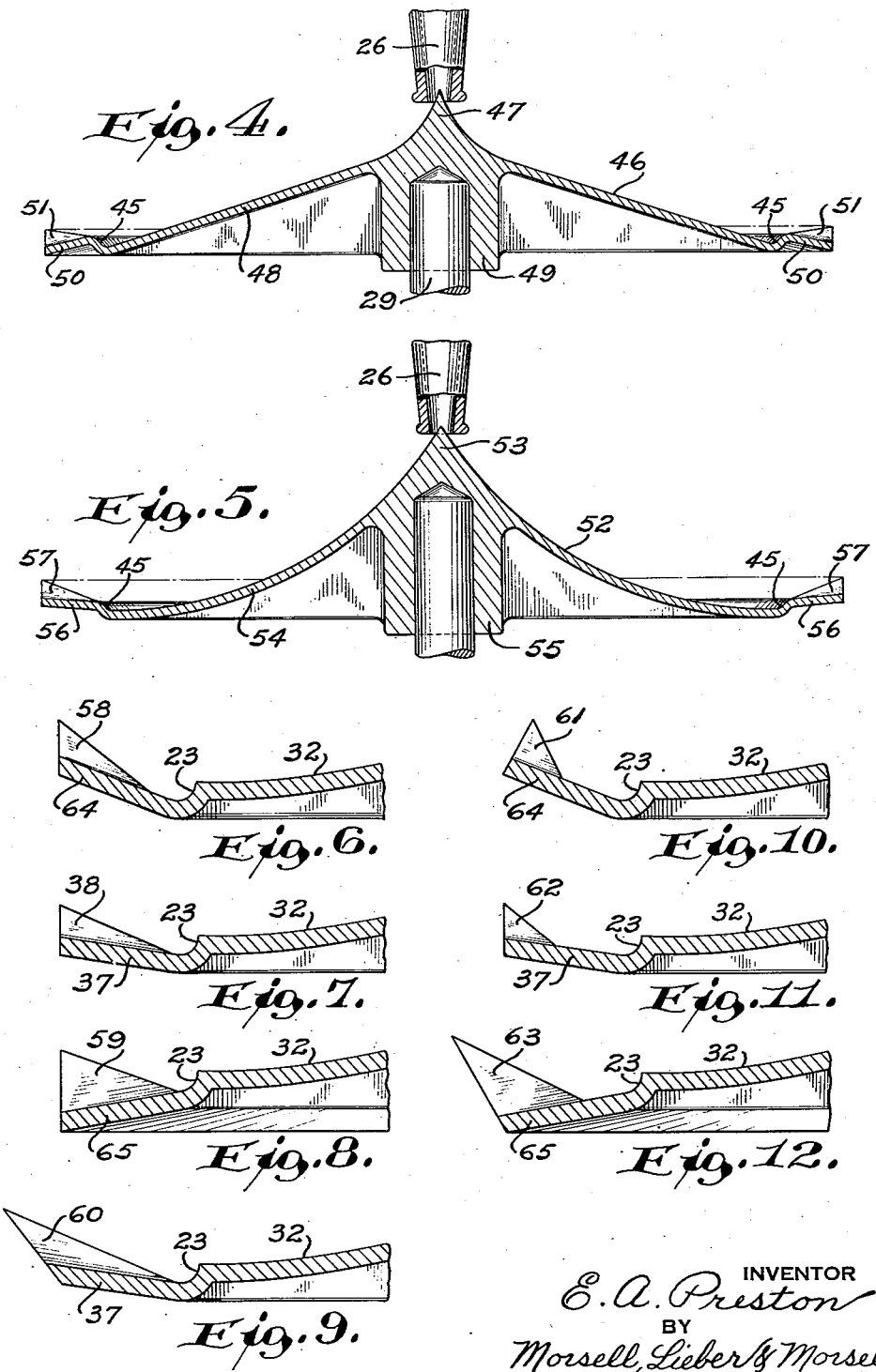

Nov. 5, 1940.  E. A. PRESTON  2,220,275
SPRAY PRODUCER
Filed Feb. 17, 1939  3 Sheets-Sheet 3

INVENTOR
E. A. Preston
BY
Morsell, Lieber & Morsell
ATTORNEYS.

Patented Nov. 5, 1940

2,220,275

UNITED STATES PATENT OFFICE 2,220,275

SPRAY PRODUCER

Everett A. Preston, Wausau, Wis., assignor to D. J. Murray Manufacturing Co., Wausau, Wis., a corporation of Wisconsin Application February 17, 1939, Serial No. 256,963

6 Claims. (Cl. 299—63)

This invention relates in general to improvements in devices for converting liquid into spray or fog, and relates more specifically to improvements in the construction and operation of spray wheels or rotors of the type forming the subject of my prior Patent No. 2,159,400, granted May 23, 1939.

As revealed by my prior application, I have heretofore proposed to utilize a spray rotor comprising a central cone, the base of which terminates in a plane disposed approximately perpendicular to the rotor axis, and having an annular series of projections and intervening recesses forming a continuous ring of serrations circumscribing and extending away from the axis of rotation substantially in the base plane. In the prior disclosures, the serrations in each instance merged directly into the conical surface and the liquid was directed against the apex of the cone in line with the axis, by means of an ordinary solid jet nozzle. While these peripherally serrated rotors with the serrations merging completely into the conical surface, are highly successful and practical for the purpose of converting many kinds of liquid into spray, they do not operate as well on some of the more viscous liquids and on other fluids having special characteristics. The prior disclosure moreover did not reveal any structure for assembling these wheels in series, with several rotors mounted in axial alinement and simultaneously rotatable by a common shaft, and while both radial and tangential serrations were heretofore disclosed and curved serrations were suggested, the latter were not specifically illustrated and claimed in my previous application.

It is therefore an object of my present invention to provide various improved details of construction especially applicable to spray rotors of the above described general type, and which will more thoroughly adapt these rotors for certain classes of work.

Another more specific object of the present invention is to provide a peripherally serrated spray producing wheel having a central liquid feeding and distributing cone at the base of which the serrations are disposed, and which is provided with a slight offset at the periphery of the cone base over which the liquid film must pass in traveling from the cone to the serrations so as to enhance the spraying action.

A further specific object of my invention is to provide an improved spray rotor wherein the liquid is gradually expanded into a uniform thin film, which, after being liberated from the initial expanding surface, is subjected to the final expansion and spraying action of a revolving series of serrations to most effectively convert the liquid into fog or spray.

Still another specific object of the present invention is to provide an improved multiple spray wheel assemblage wherein the liquid from the same or from independent sources may be subjected to the spraying action of one or more rotors rotatable about a common axis, and in which the fluid to be treated will be most effectively deposited upon each of the several wheels.

An additional specific object of this invention is to provide various improvements in the formation and disposition of the spray producing serrations of a rotor, whereby most efficient conversion of various types of fluids into spray or fog may be effected with minimum effort and power consumption.

Another specific object of my present invention is to provide various improvements in the construction of mechanical spray producers, whereby the efficiency thereof is enhanced to a maximum, while the cost of producing and of operating the same is minimized.

These and other specific objects and advantages of my present improvements will be apparent from the following detailed description.

A clear conception of embodiments of the various features constituting my present improvement, and of the mode of constructing and of operating several different types of spray producing rotors built in accordance with this invention, may be had by referring to the drawings accompanying and forming a part of this specification wherein like reference characters designate the same or similar parts in the various views:

Fig. 1 is a central vertical section through one type of the improved spray wheel having a relatively flat central feeding and distributing cone to which the liquid is delivered from a solid jet nozzle directed axially of the rotor;

Fig. 2 is a central vertical section through another type of my improved spray wheel, having a somewhat steeper central cone to which the liquid is supplied from an annular nozzle;

Fig. 3 is a central vertical section through still another type of the improved spray wheel, having a still steeper and truly conical liquid feeding and distributing surface, and being provided with an annular jet delivery nozzle;

Fig. 4 is a central vertical section through another type of my improved spray producing rotor, having a relatively flat conical center to which a solid jet is delivered in line with the rotor axis;

Fig. 5 is a central vertical section through a further modified spray rotor having relatively steep central conical distributing surface to which a solid jet of liquid is delivered;

Fig. 6 is an enlarged fragmentary section of the peripheral portion of a wheel of the type shown in Fig. 2, showing a modified type of serration and an upwardly inclined peripheral edge portion;

Fig. 7 is a similarly enlarged fragmentary section of the peripheral portion of the rotor of Fig. 2;

Fig. 8 is a likewise enlarged fragmentary section of the peripheral portion of a modified wheel of the type shown in Fig. 2, showing another type of serration and a downwardly inclined peripheral edge portion;

Fig. 9 is another enlarged fragmentary section of the peripheral portion of a wheel of the type shown in Figs. 2 and 7, showing serrations which project outwardly beyond the wheel edge;

Fig. 10 is a section through a wheel similar to that of Fig. 6, but showing modified serrations which are shorter and more abruptly inclined;

Fig. 11 is a section through a rotor similar to that of Fig. 7, but with short and abruptly inclined serrations;

Fig. 12 is a section through a wheel like that of Fig. 8, but with more abruptly inclined serrations projecting outwardly beyond the rotor periphery;

Figure 16:
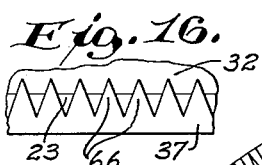
Fig. 16 is an end view of several serrations of one type having sharp crests and troughs.

While the modified spray wheels comprising the present invention all embody slight off-sets between the base edge of the feeding and distributing cone and the inner ends of the peripheral serrations, these modified rotors are still deemed subject to the claims of my earlier application, and the maximum variations in formation of the serrations may also be carried considerably beyond the ranges disclosed herein by way of illustration.

Referring to the spray producing wheels shown in Figs. 1, 2, 3 and 6 to 12 inclusive, each of these wheels comprises a central feeding and distributing conical surface to which liquid may be delivered in line with the rotor axis, and which terminates in an abrupt off-set 23; and an annular series of serrations surrounding and disposed in the path of the liquid film delivered from the conical film forming surface at the off-set 23 during normal rotation of the wheel.

In the rotor of Fig. 1, the relatively flat conical surface 24 is concavely curved and extends from the pointed apex 25 which is in line with the solid jet liquid supply nozzle 26, to the annular off-set 23. The nozzle 26 is stationary, and the surface 24 is formed on a disk 27 having an integral hub 28 secured to a rotary shaft 29 in any suitable manner. The shaft 29 is rotatable at any desired speed in any convenient manner, and the apex 25 and nozzle orifice are axially alined with the shaft 29. The peripheral portion 30 of the disk 27, outwardly beyond the off-set 23, is inclined upwardly substantially parallel to the film delivery portion of the surface 24, and the serrations 31 of this particular wheel are formed integral with the disk portion 30 and have V-shaped crests and troughs as illustrated diagrammatically near the cone apex 25. The serrations 31 of this embodiment are relatively long and have smooth surfaces disposed in the path of the film delivered from the surface 24 at the off-set 23 when the rotor is revolving at normal speed, and this rotor is especially adapted for attachment to the extreme end of the shaft 29.

In the spray wheel of Fig. 2, the conical film forming surface 32 is concavely curved but is more steeply inclined than in Fig. 1, and the apex portion 33 surrounds the supporting shaft 29 and is disposed in line with the annular orifice of a stationary nozzle 34 which also embraces the shaft 29. The disk 35 of this modified rotor has a hub 36 which is secured to an intermediate portion of the rotating shaft 29, so that this type of rotor and nozzle 34 can be utilized in series with a rotor such as shown in Fig. 1 and may be mounted upon and rotatable by the same shaft 29. The peripheral portion 37 of the disk 35, which is located outwardly beyond the off-set 23, is not as abruptly inclined as in Fig. 1, and the V-shaped serrations 38 of this modification are again provided with smooth surfaces extending away from the off-set 23 and located in the path of the film discharged from the conical surface 32 during normal operation of the assemblage.

In the spray wheel of Fig. 3, the conical liquid feeding and distributing surface 39 has straight line generatrices and is rather steeply inclined; and the apex portion 40 of this wheel again surrounds the shaft 29 and cooperates with a stationary annular jet nozzle 34 as in Fig. 2. This rotor has a disk 41 provided with a hub 42 secured to a medial portion of the revolving shaft 29, and the peripheral portion 43 of the wheel beyond the off-set 23 is downwardly inclined approximately parallel to the surface 39. The peripheral serrations 44 are formed integral with the portion 43 and have smooth surfaces extending away from the off-set 23 in the path of the film delivered from the base of the cone when the wheel is revolving at normal speed, and this modified rotor assemblage may also be operated in series with rotors such as illustrated in Figs. 1 and 2 and may be associated with a common shaft with other wheels.

In Figs. 4 and 5, the spray rotors are provided with an off-set 45 at the base of the cone, which is different from the off-sets 23 in the other disclosures, since the annular off-set 45 extends upwardly and forms a dam at the delivery edge of the liquid feeding and distributing conical surface.

Referring specifically to Fig. 4, the film forming conical surface 46 is provided with a sharp conical tip 47 cooperating with a solid jet liquid supply nozzle 26, and has straight line generatrices between the apex tip 47 and the off-set 45. The rotor disk 48 has a hub 49 secured to a supporting shaft 29, and the stationary nozzle 26 and diverting tip 47 are disposed in axial alinement with the shaft 29. The peripheral portion 50 of this rotor, beyond the off-set 45, is inclined downwardly and substantially parallel to the conical surface 46, and the serrations 51 which are formed integral with the portion 50 have smooth surfaces extending away from the top of the off-set 45 in the path of the film delivered from the distributing cone during normal operation of the rotor.

In Fig. 5, the conical film producing surface 52 is concavely curved from the off-set 45 to the apex 53, and the latter again cooperates with a stationary solid jet supply nozzle 26. The rotor disk 54 on which the surface 52 is formed, has a supporting hub 55 secured to a shaft 29, and the rotor portion 56 beyond the off-set 45 is directed approximately horizontal. The serrations 57 which are formed integral with the peripheral portion 56 have smooth surfaces extending away from the off-set 45 in the path of the liquid film delivered from the base of the distributing cone.

The serrations of my improved spray wheel may be of various sizes and shapes, and may be disposed in different positions with respect to the off-set at the base of the film forming and distributing cone, as clearly shown in Figs. 6 to 12 inclusive. In all of these illustrations, I have shown the serrations applied to a relatively standard rotor of the type shown in Fig. 2, having an off-set 23 at the base of a conical surface 32, but it should be understood that any of these modified types of serrations may be applied to any of the other styles of rotors depicted herein.

In Fig. 6, the peripheral projections or serrations 58 are relatively long but of moderate height, and are carried by a peripheral rotor portion 64 which is rather steeply inclined relative to the plane of discharge of the liquid film, from the surface 32. With this type of rotor, the liquid film would naturally be crowded into the recesses between the successive serrations 58, and delivery of the spray from the wheel periphery would be somewhat retarded by this crowding action.

In Fig. 7, the serrations 38 and the peripheral rotor portion 37 are of the same general form as shown in Fig. 2, and the liquid film after leaving the distributing surface 32 at the off-set 23 will gradually engage the smooth surfaces of the serrations 38 and will gradually expand to the bursting stage while it travels outwardly along these serrated surfaces.

In Fig. 8 the serrations 59 are of the same length as those of Fig. 7, but are considerably higher by virtue of the fact that they are supported by a downwardly inclined peripheral rotor portion 65. This construction provides greater surface area on the serrations 59 and therefore produces more extreme expansion of the liquid film traveling along these serrations, and delivered thereto from the cone surface 32.

In Fig. 9 is shown a rotor similar to that of Fig. 7, but having serrations 60 which are considerably lengthened, and which extend outwardly beyond the peripheral edge of the wheel portion 37. This modified type of tooth or serration 60 provides longer surfaces of travel for the liquid film passing outwardly along the serrations.

In Fig. 10, I have shown a rotor of the type illustrated in Fig. 6, but having shorter serrations 61 associated with the steeply inclined peripheral portion 64 thereof. This construction provides a somewhat greater gap between the off-set 23 and the inner ends of the serrations 61, and also provides shorter surfaces of travel for the film along these serrations. The inner faces of the serrations 61 are obviously quite steeply inclined, as compared to the corresponding faces of the longer serrations 58 of Fig. 6.

Fig. 11 shows a wheel like that of Fig. 7, but having relatively short serrations 62 with steeply inclined inner surfaces and edges, associated with the rotor portion 37. This assemblage provides a rather wide gap between the off-set 23 and the serrations 62 as in Fig. 10, and also reduces the length of the surfaces of the serrations along which the liquid travels. However, in the embodiment of Fig. 11, the peripheral rotor portion 37 is out of the path of travel of the liquid film which is delivered from the surface 32.

In Fig. 12, the rotor is like that of Fig. 8, having a downwardly inclined portion 65, but the modified serrations 63 are spaced farther from the off-set 23 and are lengthened in the direction of flow of the film so as to project beyond the periphery of the wheel portion 65. With this type of wheel, the film delivered from the peripheral edge of the surface 32 will freely expand until it engages the serrations 63 whereupon its expansion will be somewhat retarded, but relatively great expansion surface is made available along the serrations.

The various types of serrations may be disposed in any desired direction with respect to the axis of rotation of the wheel, depending upon the characteristics of the fluent material which is to be treated.

Figure 13:
Fig. 13 is a plan view of a fragment of a spray wheel having truly radial peripheral serrations.
Figure 14:
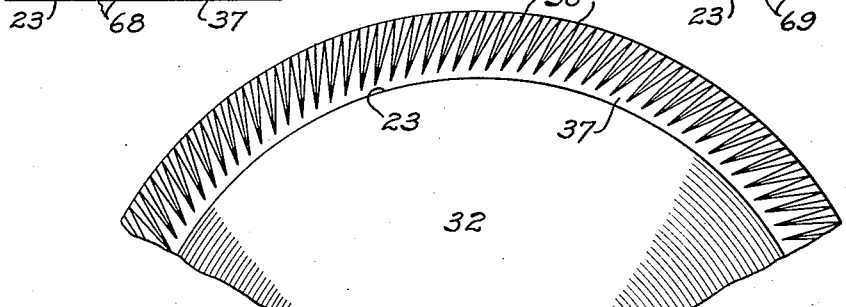
Fig. 14 is a plan view of a wheel fragment having serrations disposed tangent to a circle surrounding the rotor axis.
Figure 15:
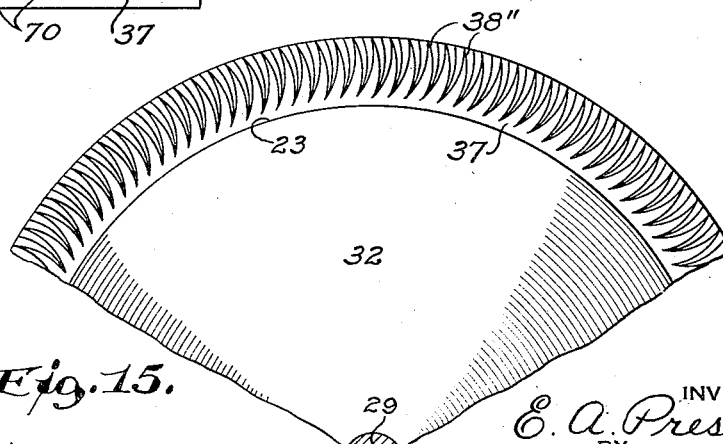
Fig. 15 is a plan view of a fragment of a rotor having curved peripheral serrations.

In Fig. 13 I have shown a top view of a fragment of a typical wheel of the form shown in Fig. 2, having the serrations 38 disposed radially with respect to the rotor axis. These serrations 38' may also be disposed tangentially with respect to a circle circumscribing the rotor axis, as in Fig. 14, or the serrations 38" may be curved as illustrated in Fig. 15. The disposition of the serrations 38, 38', 38" will depend upon the characteristics of the liquid and the type of spray wheel which is to be formed, and is therefore subject to considerable variation.

Figure 17:
Fig. 17 is a similar end view of several serrations of the same type but of wider formation.
Figure 18:
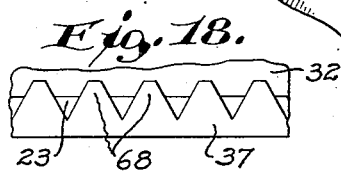
Fig. 18 is an end view of several serrations having blunt crests but sharp troughs.
Figure 19:
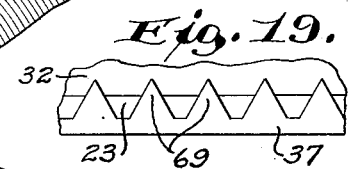
Fig. 19 is a similar view of several serrations having sharp crests and blunt troughs.
Figure 20:
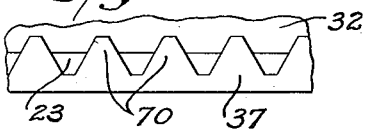
Fig. 20 is still another similar view of several serrations having blunt crests and troughs.

The cross-section of the serrations of my improved spray wheel, is also subject to variation dependent upon the class of work to be performed. As previously indicated, the ridges and grooves which form the serrations, are preferably generally V-shaped, but the slope of the side surfaces may be increased or diminished throughout a considerable range. In Fig. 16 is shown a fragment of a wheel wherein the serrations 66 have steeply inclined side surfaces thus making these serrations rather high as compared to their width. In Fig. 17 the serrations 67 are of the same height as in Fig. 16, but the sides are sloped less steeply thus making these serrations 67 considerably wider and fewer than in Fig. 16. In Fig. 18 the modified serrations 68 are again of the same height, but the tops of these serrations have been cut off to provide a flat upwardly and outwardly inclined surface at the top of each serration 68. In Fig. 19, the V-shaped serrations 69 are separated by flat bottomed recesses thus providing relatively wide spaces between the successive serrations 69. In Fig. 20 the serrations 70 have flat tops and the successive serrations 70 are also separated as in Fig. 19, by flat bottomed recesses. While I have shown only a few of the variations in cross-sections which may be used in forming the serrations, it must be apparent that many other cross-sections may be adopted.

The improved rotors may either be mounted upon the end of a driving shaft 29 as in Figs. 1, 4 and 5, or they may be mounted upon the medial portion of such a shaft 29 as illustrated in Figs. 2 and 3. If the rotor is supported at the end of a shaft 29, a stationary solid jet supply nozzle 26 may be utilized, and this nozzle 26 should preferably be disposed so as to deliver the jet in true alinement with the apex of the conical surface of the rotor. If the spray wheel is attached to a medial portion of a shaft 29, then a nozzle 34 such as shown in Figs. 2 and 3 may be utilized, this nozzle being adapted to deliver an annular jet of liquid against the conical surface of the rotor, in true alinement with the shaft 29. When the rotor shaft 29 is revolved at the proper speed, the jet of liquid will flow along the conical rotor surface and will be simultaneously reduced in form to a relatively thin and uniform film. This film will eventually be delivered from the peripheral edge of the conical surface over the off-set, and toward the annular series of serrations at the rotor periphery. If an off-set 23 is utilized, the film of liquid is delivered through free space before it again engages the serrations, but if an off-set 45 is employed, then the film will pass directly from the upper edge of the off-set along the serrations. In either case, the off-set tends to equalize the tension in the film and to more uniformly distribute the same before it is finally converted into spray by the peripheral projections or serrations. The off-set in either case should not be very abrupt and the rotation of the rotor should be insufficient to cause the film to be discharged beyond the periphery of the wheel without being acted upon by the serrations.

From the foregoing detailed description of the construction and operation of my improved spray wheel, it will be apparent that this invention provides a spray producing rotor which is simple and compact in construction and which is highly efficient in operation. The provision of an off-set at the base of the cone is an important feature of the present invention, and this off-set has been found extremely advantageous in actual operation of these rotors, especially when treating certain types of liquid. The formation of the projections or serrations is also important, and the proper form of these serrations must be selected so that most effective treatment of a certain type of liquid will result, and it has been found that the variation in the formation of the serrations may be extended throughout a considerable range. The formation of the conical surface which initially transforms the jet into a film, is likewise rather important and is subject to considerable variation depending upon the characteristics of the liquid being treated, and with the aid of the nozzles 34, the improved wheels may be applied in series or in multiplicity to a common shaft. The improved rotor has proven extremely satisfactory in actual commercial use, and can be manufactured at relatively moderate cost.

It should be understood that it is not desired to limit this invention to the exact details of construction, or to the precise mode of operation herein shown and described, for various modifications within the scope of the claims may occur to persons skilled in the art.

I claim:

1. A spray producing rotor comprising, a central conical surface terminating in a plane disposed approximately perpendicular to the rotor axis, an annular series of serrations forming a continuous undulated surface surrounding and directed away from said axis and crossing said plane, and an off-set located directly between the extreme outer peripheral edge of said conical surface and the extreme inner ends of said serrations.

2. A spray producing rotor comprising, a conical surface revolvable about its central axis and terminating at its periphery in an annular smoothly curved off-set, and an annular series of serrations directed away from said axis and surrounding said off-set, the inner ends of said serrations being disposed directly adjacent to said off-set.

3. A spray producing rotor comprising, a conical surface revolvable about its central axis and terminating at its base in a plane disposed approximately perpendicular to said axis, an annular off-set surrounding said axis and extending and being gradually curved away from the extreme peripheral edge of said surface, and an annular series of serrations having their inner ends disposed directly adjacent to said off-set and extending outwardly away from said off-set, said serrations forming a continuous undulated annular surface crossing said plane at an oblique angle.

4. A spray producing rotor comprising, a conical surface revolvable about its central axis and terminating at its base in a plane disposed approximately perpendicular to said axis, an annular off-set surrounding said axis and extending away from the peripheral edge of said surface to provide an annular dam surrounding said surface, and an annular series of serrations carried by said rotor and away from the crest of said dam.

5. A spray producing rotor comprising, a conical surface revolvable about its central axis and terminating at the periphery of its base in an annular off-set, and an annular series of serrations directed away from said axis and surrounding said off-set, the inner ends of said serrations merging into said off-set and said serrations being of increasing height and width receding from the off-set.

6. A spray producing rotor comprising, a conical surface revolvable about its central axis and terminating at the periphery of its base in an annular off-set providing an annular dam surrounding said surface, and an annular series of serrations directed away from said axis and surrounding said off-set, the inner ends of said serrations merging into the crest of the dam formed by said off-set and said serrations being of increasing height and width receding from said dam.

EVERETT A. PRESTON.